Patented June 3, 1930

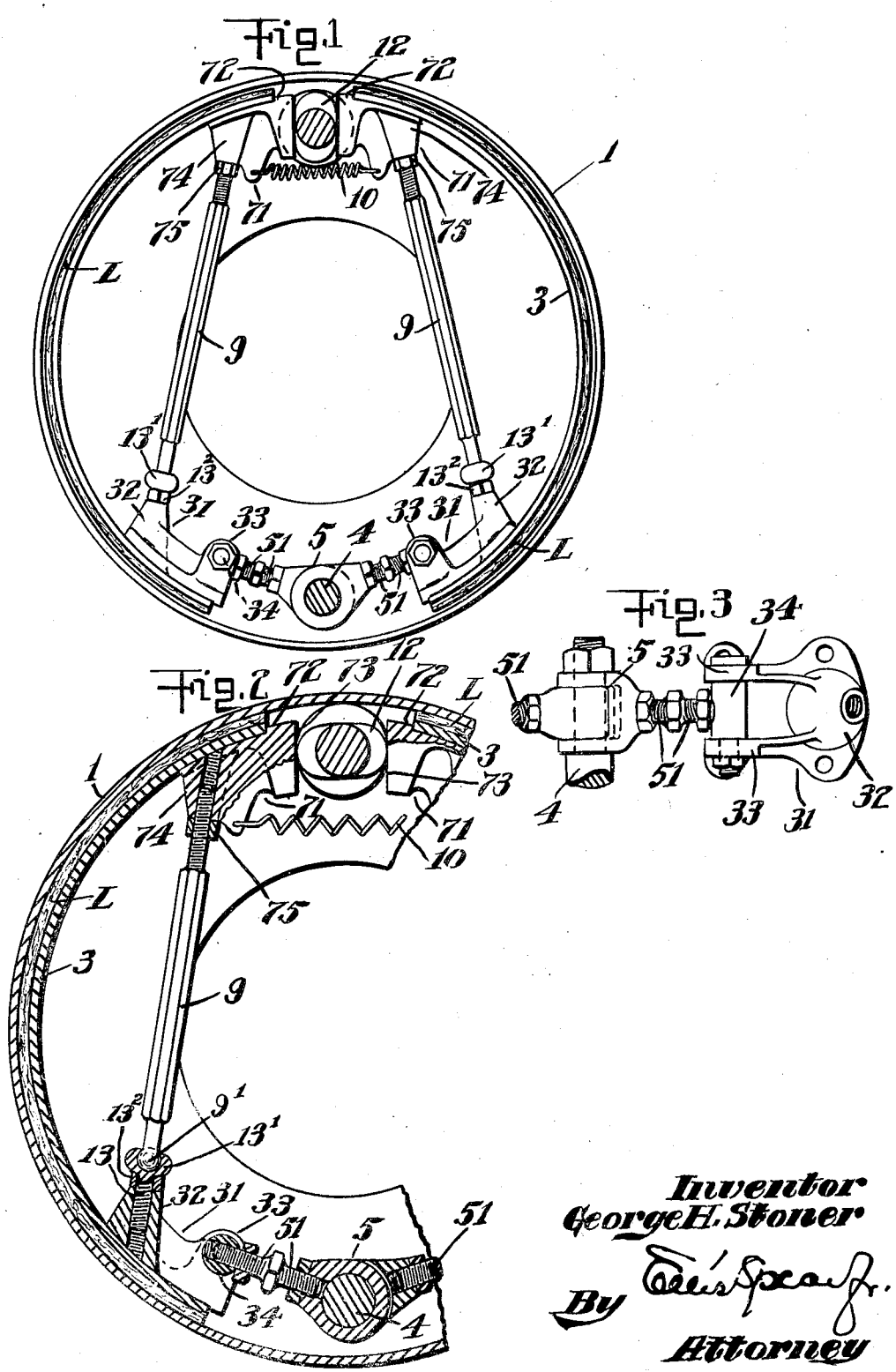

1,761,027

UNITED STATES PATENT OFFICE

GEORGE H. STONER, OF EAST BOSTON, MASSACHUSETTS, ASSIGNOR, BY MESNE ASSIGN-
MENTS, TO STONER-AMES BRAKE COMPANY, INC., OF BOSTON, MASSACHUSETTS, A
CORPORATION OF MASSACHUSETTS

BRAKE

Application filed April 22, 1926. Serial No. 103,964.

My present invention involves certain improvements in such structures as brakes, and particularly in such as are of the expanding type. As illustrative of my invention I will discuss it in connection with my own particular type of brake as disclosed for example in my prior Patents Nos. 1,550,398 and 1,550,399 both dated August 18, 1925.

In practice and particularly in the handling of such brakes in relining or like operation there is a liability to distortion due to carelessness, lack of skill or equipment which I have been able to anticipate by certain improvements in structure. Such are well illustrated in the structure shown in the accompanying drawings and the structure itself offering a highly efficient device solving the difficulties involved in a highly satisfactory manner.

I will therefore proceed at once to a description of this structure, making reference to the drawings in illustration thereof. Throughout the specification and drawings like reference characters are used to indicate corresponding parts, and in the drawings:

Fig. 1 is a view of a brake construction in accordance with my invention.

Fig. 2 is an enlarged fragmentary view partly in section, and

Fig. 3 is a fragmentary plan of the hinge member.

The principles involved in my type of brake have been discussed at length in my previous patents referred to above.

In the embodiment shown the brake drum 1 may be of usual type. My resilient internal members are shown as comprising the strips 3 of flexible stock to which is riveted the brake lining L. At two adjacent ends these strips 3 are provided with rigid members 31 between which is an adjustable hinge connection to be hereinafter described. At their opposite ends between which in the form shown lies the operating cam 12 are other rigid members 7. The plates 71 and 31 are riveted or otherwise attached to the flexible members 3.

The members 71 each comprise a flanged base substantially fitting the end of the flexible member 3, being preferably stepped as at 72 to give a reinforcement against the thrust of the operating cam 12. It has a cam bearing face 73 which is held in yielding contact with the cam by any suitable resilient device, as by a spring 10.

A boss 74 is formed on each member 71 and these are tapped to receive the threaded end of the chord member 9 which is in effect an adjustable screw strut for the flexible arc member and may be locked by the nut 75.

At its opposite end the strut 9 may be provided with a ball end $9^1$ (see Fig. 2). This is socketed as at $13^1$ in the head of a threaded adjusting piece 13 locked by a nut $13^2$ in the tapped boss 32 of the member 31.

This rigid member 31 briefly referred to heretofore in connection with the usual hinging of the shoes has a flat base fitting the end of the flexible arc member 3 and shouldered to receive its end. At its own end it is formed with a pair of ears 33 transversely drilled to form a bearing for a rocker piece 34. This piece is in turn drilled and tapped to receive the threaded stem 51 connecting the hinge piece 5 which knuckle together and, in the form shown, are drilled to slip over the usual bracket pin 4.

This construction gives a double compensation between the substantially circumferential thrust along the line of the connecting stem 51 and the support of the arc strut 9. This strut 9 also has both a cooperative and independent free footing by its ball 9 in the socket $13^1$.

In this way the integrity of the arc shoe is preserved at all times, pressures and strains are distributed and equalized, and a maximum of flexible area of the strips 3 is afforded. The structure is also free from liability of crimping in relining. All this is effected without interfering with the simplicity and ease of adjustment.

What I therefore claim and desire to secure by Letters Patent is:—

1. In an internal brake, a pair of flexible arc members, an adjusting chord strut member for each, a rigid piece affixed adjacent an end of each flexible member and comprising a base, an adjusting bearing for the strut member end, a rocker on the rigid piece and having its axis transversely thereof, and a hinge member adjustably connected to said rocker members.

2. In an internal brake, a flexible arc member, an adjusting truss piece, a rigid end piece attached thereto and comprising a combined truss bearing and hinge plate, a swivel truss rod bearing on said rigid piece and a transversely hinged rocker disposed thereon, and a hinge member adjustably connected to said rocker.

3. In an internal brake, a flexible arc member, a rigid piece affixed adjacent each end thereof, a truss chord member adjustably connected to one piece at one end and having its other end pivotally connected to the other piece.

4. In an internal brake, a pair of flexible arc members, a rigid piece affixed adjacent an end of each and comprising a base, a rocker having an axis transversely of the arc member and a hinge member adjustably connected to said rocker.

5. In an internal expanding brake, a pair of flexible arc members, means for adjusting the curvature of said arc members, a fixed hinge connecting said members and adjustably and pivotally connected to the adjacent end of each of said members.

6. In an internal brake, a flexible arc member, a rigid piece affixed adjacent each end thereof and an adjustable truss chord member between said pieces pivotally connected with one of them.

In testimony whereof I affix my signature.

GEORGE H. STONER.